(12) United States Patent
Sulakhe et al.

(10) Patent No.: US 7,103,014 B1
(45) Date of Patent: Sep. 5, 2006

(54) SYSTEMS AND METHODS FOR IMPROVING SOUND QUALITY IN COMPUTER-NETWORK TELEPHONY APPLICATION

(75) Inventors: Amit P. Sulakhe, Pune (IN); Sachin Ghanekar, Pune (IN); Pushkar G. Patwardhan, Pune (IN)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 11/255,460

(22) Filed: Oct. 21, 2005

Related U.S. Application Data

(63) Continuation of application No. 09/911,012, filed on Jul. 23, 2001.

(51) Int. Cl.
*H04B 3/20* (2006.01)
(52) U.S. Cl. .................. 370/286; 370/352; 370/528
(58) Field of Classification Search ............... 370/528, 370/529, 286
See application file for complete search history.

(56) References Cited

U.S. PATENT DOCUMENTS

| | | | |
|---|---|---|---|
| 6,226,290 B1 * | 5/2001 | Salett et al. | 370/389 |
| 6,522,746 B1 * | 2/2003 | Marchok et al. | 379/406.03 |
| 6,928,161 B1 * | 8/2005 | Graumann | 379/406.08 |
| 6,937,624 B1 * | 8/2005 | Gavin | 370/528 |

* cited by examiner

*Primary Examiner*—Brian Nguyen
(74) *Attorney, Agent, or Firm*—James J. Murphy; Thompson & Knight LLP

(57) ABSTRACT

A method of generating comfort noise in a communications includes selecting a packet of data from a stream of packets being received across a communications network, the packet comprising a selected number of data samples. Ones of the data samples from the selected packet are played out in a sequence as comfort noise to fill a dead gap. The sequence is reversed when a randomly selected sample in the packet is reached and corresponding ones of the data samples are transmitted across the network as comfort noise after the order is reversed.

10 Claims, 3 Drawing Sheets

SYSTEMS AND METHODS FOR IMPROVING SOUND QUALITY IN COMPUTER-NETWORK TELEPHONY APPLICATION

The present application is a continuation of copending U.S. application Ser. No. 09/911,012 filed Jul. 23, 2001.

FIELD OF INVENTION

The present invention relates in general to computer networks and in particular to systems and methods for improving sound quality in computer-network telephony applications.

BACKGROUND OF INVENTION

Global computer networks, such as the Internet and the World Wide Web are commonly used to exchange digitized audio, video, graphics and text between end-user terminals. Moreover, networking technology has now advanced to the point where telephony over these platforms is also practical. In the case of the Internet, voice data input from a microphone at the transmitting terminal is digitally packetized per the Internet Protocol (IP) and transmitted via the Internet to the receiving terminal where it is unpacked and reconverted back into voice. While having many advantages, computer networked-based telephony is still subject to a number of disadvantages vis a vis traditional telephony.

In IP telephony, only packets carrying active speech samples are transmitted to save bandwidth. Consequently, the data reaching the receiving terminal is discontinuous, resulting in audible "clicks" and "pops," in the speaker or headset. Another undesirable effect at the receiving end is echo caused by feedback between the speaker and the microphone at the sender's terminal. An echo suppressor can be used to alleviate this effect, however, echo suppression often results in modulated noise and a "dead-set" phenomenon at the receiving end.

Given the increasing popularity of computer network-based telephony, techniques are required to reduce or eliminate echo without introducing the "dead-set" phenomenon. Further, the problem of clicks and pops caused by gaps in transmission of active data must also be addressed. In other words, techniques are required for improving echo suppressor performance and receiving terminal performance in light of discontinuous signal transmission.

SUMMARY OF INVENTION

The principles of the present invention are disclosed in a method of selectively producing comfort noise in a computer network-based telephony system including a transmitting terminal. The method includes the steps of sampling background noise local to the transmitting terminal, and storing the resulting samples of background noise in a buffer. When an echo is detected, the samples of background noise are transmitted from the buffer onto the computer network.

The inventive principles are additionally embodied in methods of filling a gap between bursts of packets of data transmitted across a computer network. According to one such method, data samples from a selected one of the packets of a first burst are stored in a buffer associated with a read pointer, the buffer having starting and ending boundaries. During a gap between the speech bursts, the stored data is transmitted from the buffer. Preferably, a data sample is retrieved from the buffer at a randomly selected read pointer value and the read pointer is then incremented in a selected direction to read next samples from the buffer. If the read pointer has reached one of the starting and ending boundaries, a rebound count is incremented and the selected direction is reversed. If rebound count has reached a selected value, the read pointer is incremented in the selected direction to generate next samples up to a random stop. When random stop is reached, the rebound count is reset and the selected direction is reversed for subsequent read pointer increments.

The inventive principles are particularly useful in computer network telephony applications, although not necessarily limited thereto. Among other things, the inventive techniques reduce or eliminate echo on a computer network telephony connection without introduction of the "dead set" phenomenon. For example, an echo suppressor is disclosed which transmits adaptive comfort noise in place of the attenuated echo signal to address the "dead set" problem.

Further, the inventive principles provide for the elimination or substantial reduction of pops and clicks typically caused in computer network based telephony systems by gaps between the transmission of packets of active voice data. For example, a method is disclosed in which gaps between bursts of data are filled with non-discontinuous, as well as non-repetitive, comfort noise signals.

DETAILED DESCRIPTION OF THE INVENTION

The principles of the present invention and their advantages are best understood by referring to the illustrated embodiment depicted in FIGS. 1–6 of the drawings, in which like numbers designate like parts.

Figure 1:
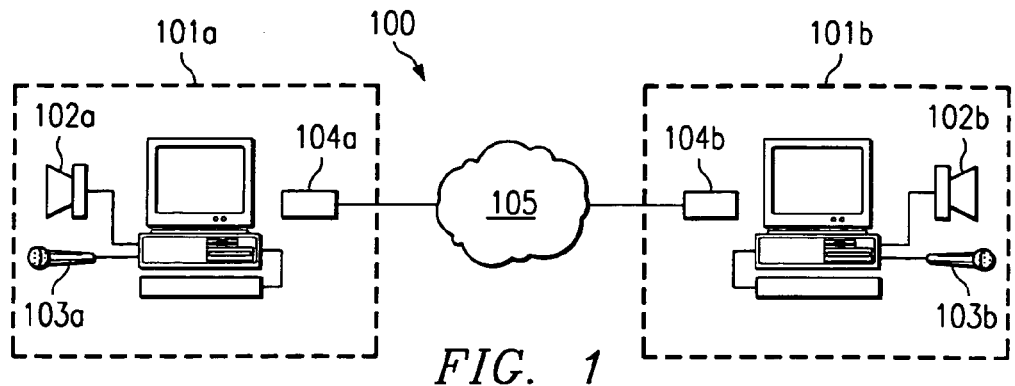
FIG. 1 is a diagram of a portion of an exemplary computer network suitable for describing the present inventive concepts.

FIG. 1 is a diagram of a portion of an exemplary computer network suitable for describing the present inventive concepts. Here, a pair of end-user terminals 101 *a,b* are represented as personal computers (PCs), although these terminals in actual practice can be any one of a number of network appliances supporting computer network telephony. Terminals 101 each include a speaker or headset 102 and a microphone 103. A modem or similar interface 104 provides a connection to a computer network 105, such as the Internet or World Wide Web, in a conventional manner.

Figure 2:
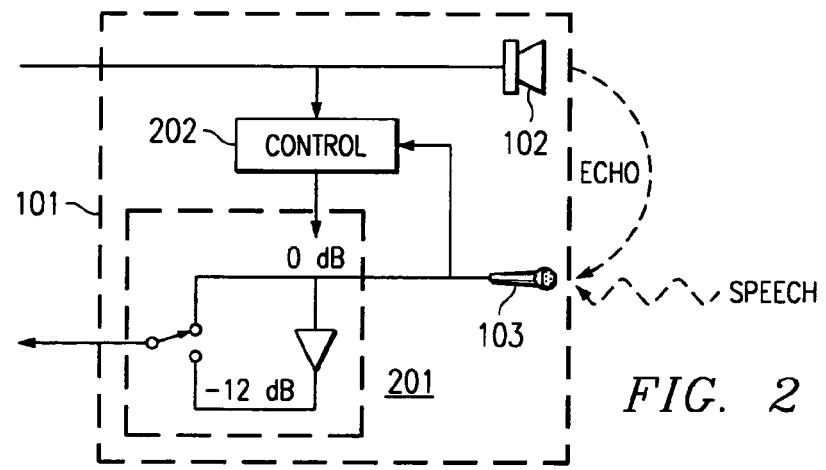
FIG. 2 illustrates a functional block diagram of conventional echo suppression circuitry.

A functional block diagram of conventional echo suppression circuitry, which includes a switch 201 and control logic 202, is shown in FIG. 2. While a speaker is using the microphone, switch 201 is set to the low impedance (0 dB) state to allow local speech to be transmitted. While no local speech is occurring, switch 201 is set in the high impedance (−12 dB) state to reduce echo. Switch 201 disadvantageously varies the noise being transmitted resulting in the dead-set effect at the receiving end. Generally, increasing the attenuation of switch 201 improves the echo suppression but worsens (increases) the dead-set effect.

Figure 3:
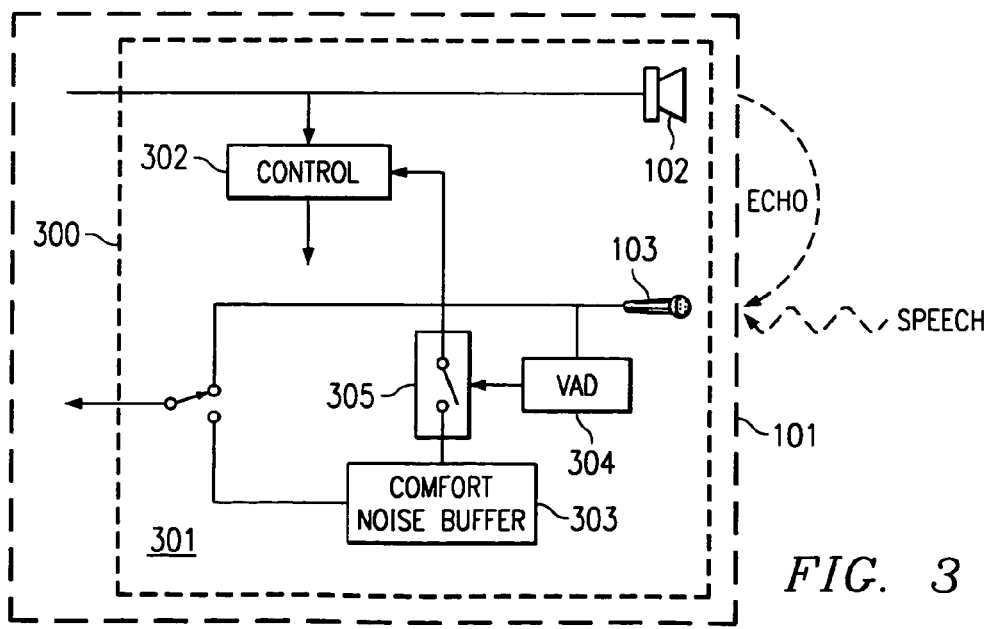
FIG. 3 illustrates echo suppression circuitry according to the inventive concepts.

Echo suppression circuitry 300 according to the inventive concepts is illustrated in FIG. 3. In the preferred embodiment, circuitry 300 includes a switch 301 selecting between the output of microphone 103 and the contents of comfort noise buffer 303 under control of control logic 302. A voice activated detector 304 controls an additional switch 305 which allows only local background noise to be passed to comfort noise buffer 303.

Preferably, the microphone is continuously turned-on in the illustrated embodiment. Voice Activity (VAD) logic 304 then sufficiently samples local background noise into comfort noise buffer 303. For example, 1 second of the latest background noise at the microphone could be sampled at an 8 kHz sampling rate to store approximately 8096 noisy samples. When control circuitry 302 detects echo, using conventional techniques, switch 301 changes to pass the output of the comfort noise buffer to the transmitter. Thus, while the primary path is being attenuated to prevent echoing, a signal the form of noise takes the place of the active data on the transmission medium.

The inventive principles realize several advantages. First, echo can be substantially reduced or eliminated without the undesirable dead-set effect. Second, the use of sampled background noise for transmission during echo suppression requires very little additional processing overhead. (In contrast, if generated noise, e.g. white noise, was used, additional processing overhead would be required to generate the noise itself.) Third, the receiver hears actual background noise which is more natural than generated noise, such as the harsh white noise generated by a random noise generator.

Figure 4:
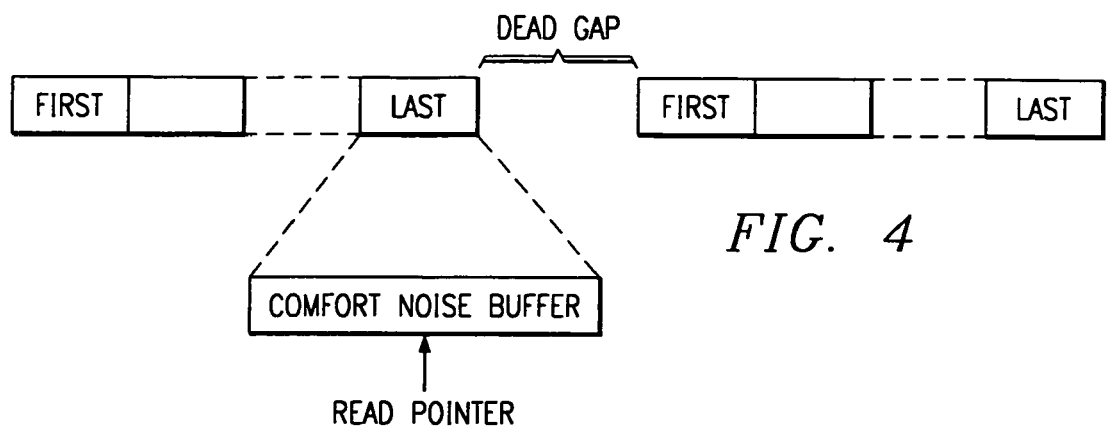
FIG. 4 illustrates an IP telephony system when active speech samples are transmitted in bursts of packets, separated by dead gaps.
Figure 5:
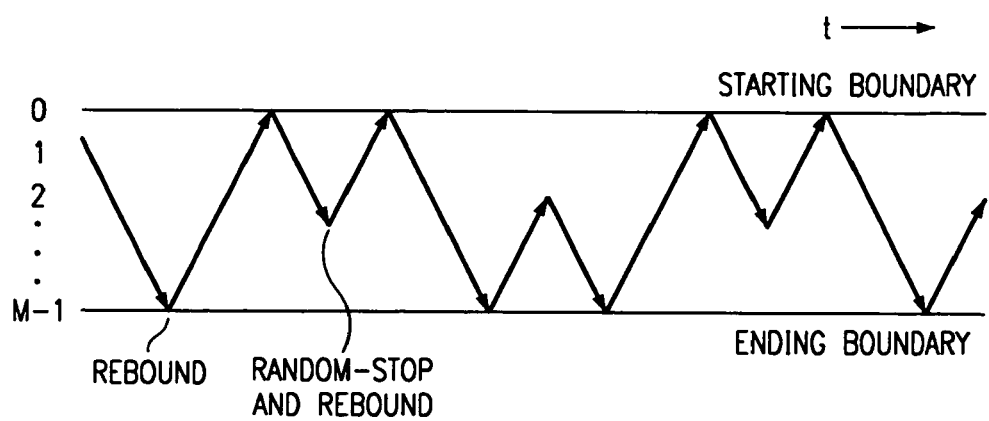
FIG. 5 illustrates the traversal through the comfort noise buffer of FIG. 4.

As illustrated in FIG. 4, in a IP telephony system active speech samples are transmitted in bursts of packets, separated by dead gaps. The dead gaps save network bandwidth but cause audible clicks and pops at the receiving end. The principles of the present invention also advantageously address this problem by filling the dead gaps with comfort noise.

In order to fill the dead gaps with comfort noise, the last packet before each dead gap is treated as a "non-voice" packet. Typically, conventional voice activated detectors provide "hold-over time" between bursts to avoid intermediate and/or frequent switching. For the most part, the last packet in the burst will therefore be a background noise packet.

It is possible to fill the dead gaps by simply repeating the last packet in each burst. However, this would result in a humming or similar periodic noise at the receiver. Also, discontinuities between the background noise packets and the following active speech packets will result in clicks and pops in the output. The present inventive principles avoid these undesirable effects by filling the dead gaps with non-periodic, continuity preserving samples.

Figure 6:
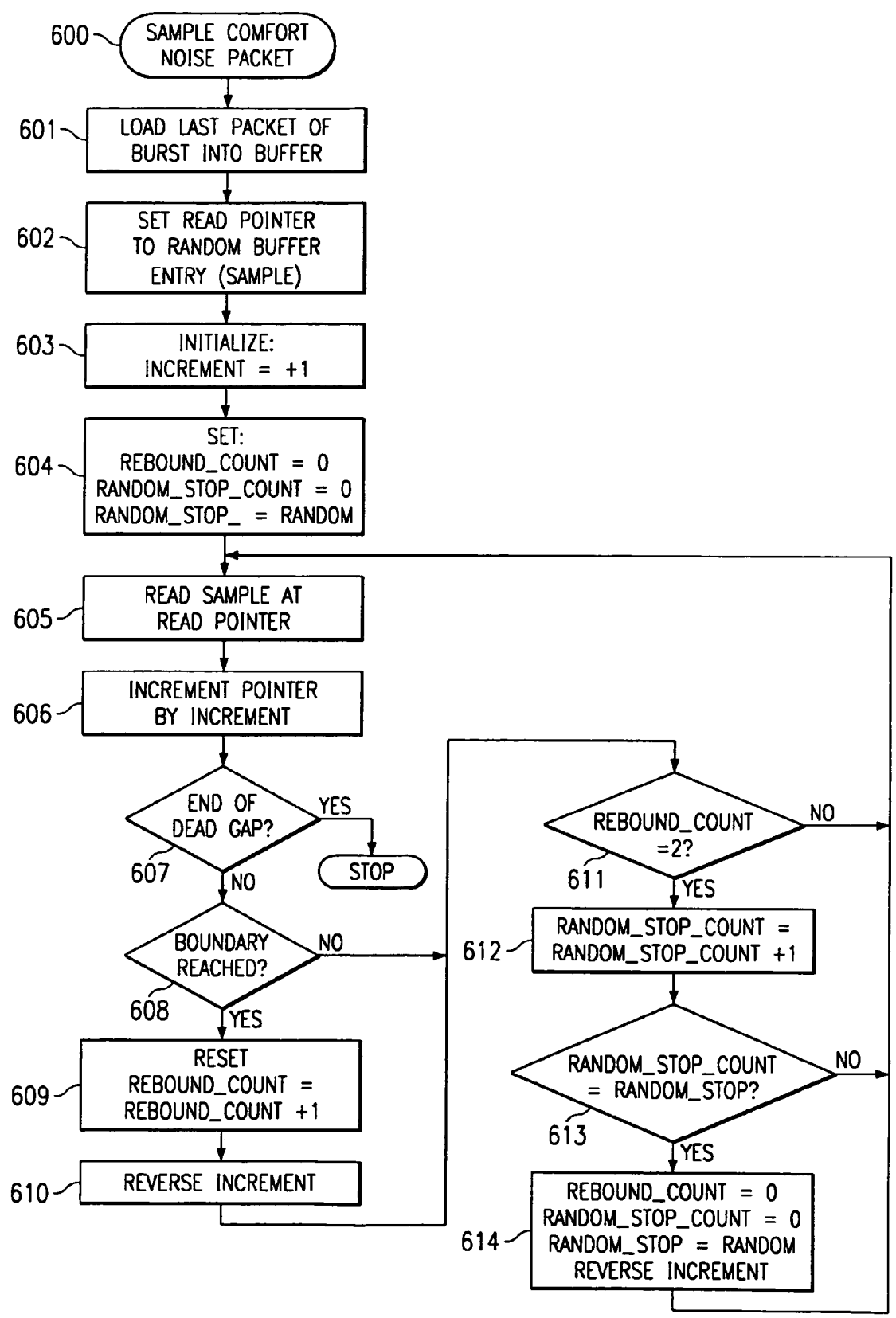
FIG. 6 is a flow chart of a preferred procedure for filling in dead gaps in a stream of data according to the inventive concepts.

FIG. 6 is a flow chart of a preferred procedure 600 for filling in dead gaps in a stream of data according to the inventive concepts. While this procedure is particularly useful in the context of voice (speech) data streaming, it is generally applicable to any application where gaps between data bursts need to be filled.

At Step 601, the last packet of the current burst is loaded into a "modulo M" comfort noise buffer. The read pointer to this buffer is initialized (Step 602) to a random entry (sample) in the buffer. The pointer is also associated with a counter having an increment value randomly initialized to ±1 at Step 603. The noise is buffered in this case "modulo M" to the extent that the pointer increments until it reaches the maximum offset M, folds back to pointer index M−1, and then traverses the buffer entries in the opposite direction (decrements). The pointer decrements until it reaches the 0 offset point, folds back to pointer index 1, and then reverses direction again. For purposes of discussion, the initial increment value will be assumed to be +1 for the first loop. At Step 604 the rebound counter value, Rebound_Count is cleared to 0, the Random_Stop_Count is set to 0, and the Random_Stop is randomly set.

The first sample is read from the buffer at the random pointer value at Step 605. This sample can then be transmitted as comfort noise via the computer network link to start filling the dead gap.

The pointer value is then incremented by ±1 at Step 606, in the direction set a Step 603. In the present example where the initial increment is +1, the pointer increments in the positive direction towards the ending boundary. If at Step 607 the end of the dead gap has been reached, sampling from the buffer ends such that active speech can be transmitted, otherwise the next sample is retrieved from the buffer and transmitted as follows.

When a boundary has been reached (Step 608), the value of Rebound_Count increments by one at Step 609 and the pointer incrementation direction reversed at Step 610. The procedure then continues to Step 611. On the other hand, if a boundary has not been reached at Step 608, the procedure jumps directly to Step 611 and continues.

On reaching every second boundary, i.e., Rebound_Count=2 at Step 611, the Random_Stop_Count increments by 1 (Step 612). If at Step 613 Random_Stop_Count has reached the Random_Stop point initialized at Step 604, then Rebound_Count and Random_Stop_Count are cleared to zero, Random_Stop takes on a new random value and the incrementation direction is reversed (Step 614). The procedure then loops back to Step 605. Otherwise, if the random stop point has not been reached at Step 613, the procedure jumps directly back to Step 605.

The random stop and rebound operation (Step 612) eliminates periodicity in the sampling which reduces or eliminates audible hum. The use of at least 2 rebounds and subsequent traversals of the buffer insures that buffer entries are sampled with equal probability and the noise spectral characteristics are preserved. In alternate embodiments, a single rebound could be used, although the samples will more likely be sampled in the region of one boundary or the other resulting in the spectral content of the noise being distorted.

Moreover, while the rebound logic described above substantially reduces or eliminates first order discontinuities in the output, and additional single-pole filter can also be added at the output of the buffer to remove any second order discontinuities as well.

In sum, procedure 600 realizes a number of advantages. Among other things, clicks and pops at the receiver are eliminated by the addition of non-periodic comfort noise to the data stream. Moreover, since actual background noise taken at the transmitting microphone is used, the generation of artificial noise is again not required. Advantageously, the comfort noise has generally the same power and spectral characteristics as the local environment at the transmitting end.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A method of filling a dead gap between bursts of packets of data received across a computer network comprising the steps of:
   storing data samples from a selected one of the packets of a first burst in a buffer associated with a read pointer, the buffer having starting and ending boundaries; and
   during a dead gap between the first burst and a second burst, playing out the stored data from the buffer one sample at a time comprising the substeps of:
      retrieving a data sample from the buffer at a randomly selected initialized read pointer value;
      incrementing the read pointer value in a selected direction to retrieve next sample from the buffer;
      if the read pointer value has reached one of the starting and ending boundaries, incrementing a rebound count;
      if the rebound count has reached a selected value, incrementing the read pointer value in the selected direction to generate at least one subsequent sample until a random stop point is reached; and
      when the random stop is reached, resetting the rebound count and reversing the selected direction for subsequent read pointer increments.

2. The method of claim 1 and further comprising the step of reversing the direction of incrementation and incrementing the rebound count if the read pointer value has reached one of the boundaries.

3. The method of claim 1 and further comprising the steps of:
   if the random stop point has been reached after a second rebound, resetting the rebound count and reversing the direction of incrementation of the read pointer.

4. The method of claim 1 wherein the selected packet comprises the last packet of the first burst before the dead gap.

5. The method of claim 1 wherein the bursts of packets comprise packets of voice data and the selected packet comprises a packet of sampled background noise.

6. The method of claim 1 and further comprising the step of filtering the data samples obtained by the dead gap filling to remove second order discontinuities.

7. The method of claim 6 wherein said step of filtering comprises the step of removing the second order discontinuities using a single pole low pass filter.

8. A computer network telephony appliance comprising:
   a buffer for storing data samples from a selected data packet of a first burst of data packets, said buffer having starting and ending boundaries;
   circuitry for reading the data samples from said buffer during a gap between the bursts of data packets and operable to:
      retrieve a data sample from the buffer at a randomly selected entry;
      move in a selected direction through said buffer to retrieve next sample from the buffer;
      if one of the starting or ending boundaries has been reached, incrementing a rebound count;
      if the rebound count has reached a selected value, moving in the selected direction through the buffer until a random stop point has been reached; and
      when the random stop point is reached, resetting the rebound count and reversing the selected direction for subsequent read pointer increments.

9. The computer network telephony appliance of claim 8 wherein the circuitry for reading is further to reverse the selected direction through the buffer when one of the starting and ending boundaries has been reached.

10. The computer network telephony appliance of claim 8 and further comprising a filter for removing second order discontinuities from the data samples obtained by a dead gap filling.

* * * * *